(12) United States Patent
Vounckx et al.

(10) Patent No.: US 11,134,186 B2
(45) Date of Patent: Sep. 28, 2021

(54) METHOD FOR CONTROLLING A ROBOTIC CAMERA AND CAMERA SYSTEM

(71) Applicant: EVS Broadcast Equipment SA, Seraing (BE)

(72) Inventors: Johan Vounckx, Linden (BE); Floriane Magera, Liège (BE); Thomas Hoyoux, Liège (BE); Tom Michel, Visé (BE); Olivier Barnich, Liège (BE)

(73) Assignee: EVS BROADCAST EQUIPMENT SA, Seraing (BE)

( * ) Notice: Subject to any disclaimer, the term of this patent is extended or adjusted under 35 U.S.C. 154(b) by 0 days.

(21) Appl. No.: 16/374,880

(22) Filed: Apr. 4, 2019

(65) Prior Publication Data

US 2019/0313010 A1    Oct. 10, 2019

(30) Foreign Application Priority Data

Apr. 5, 2018 (EP) ..................................... 18165984

(51) Int. Cl.
| | |
|---|---|
| *H04N 5/00* | (2011.01) |
| *H04N 5/232* | (2006.01) |
| *G06K 9/00* | (2006.01) |
| *H04N 5/247* | (2006.01) |
| *H04N 5/262* | (2006.01) |

(52) U.S. Cl.
CPC ..... *H04N 5/23216* (2013.01); *G06K 9/00624* (2013.01); *H04N 5/23203* (2013.01); *H04N 5/23222* (2013.01); *H04N 5/23225* (2013.01); *H04N 5/23296* (2013.01); *H04N 5/23299* (2018.08); *H04N 5/247* (2013.01); *H04N 5/2628* (2013.01)

(58) Field of Classification Search
CPC .......... H04N 5/232; H04N 5/00; G11B 27/34; G11B 27/036; G11B 27/00
USPC ................................................. 348/142–160
See application file for complete search history.

(56) References Cited

U.S. PATENT DOCUMENTS

| | | |
|---|---|---|
| 8,335,751 B1 | 12/2012 | Daily et al. |
| 2005/0058322 A1 | 3/2005 | Farmer et al. |
| 2009/0315978 A1 | 12/2009 | Wuermlin et al. |
| 2009/0316964 A1 | 12/2009 | Mahesh et al. |
| 2011/0090302 A1 | 4/2011 | Leviav et al. |
| 2011/0242326 A1 | 10/2011 | Essa et al. |

(Continued)

OTHER PUBLICATIONS

European Search Report for 18165984 dated Jul. 5, 2018.

(Continued)

*Primary Examiner* — Maryam A Nasri
(74) *Attorney, Agent, or Firm* — Meagher Emanuel Laks Goldberg & Liao, LLP.

(57) ABSTRACT

A method for controlling a robotic camera capturing a portion of a playing field is suggested. An image region of interest is determined in a reference image of the playing field. The image region of interest is determined by artificial intelligence. The image region of interest is associated with a physical region of interest on the playing field. From the physical region of interest control parameters for the robotic camera are deducted such that the robotic camera captures the physical region of interest on the playing field. As a result it is achieved that the robotic camera automatically captures the most interesting scene on the playing field. Furthermore, a camera system is suggested that implements the method.

14 Claims, 12 Drawing Sheets

(56) References Cited

U.S. PATENT DOCUMENTS

| | | | |
|---|---|---|---|
| 2012/0007999 A1 | 1/2012 | Horii | |
| 2014/0168432 A1* | 6/2014 | Nystrom | H04N 5/23212 |
| | | | 348/143 |
| 2014/0241624 A1 | 8/2014 | Gurbuz | |
| 2016/0104510 A1 | 4/2016 | Tamir et al. | |
| 2016/0277673 A1 | 9/2016 | Carr et al. | |
| 2017/0125064 A1* | 5/2017 | Aggarwal | G06K 9/00744 |
| 2019/0378400 A1* | 12/2019 | Lisaj | A63F 13/332 |

OTHER PUBLICATIONS

Szenberg et al., "Automatic camera calibration for image sequences of a football match", Advances in Pattern Recognition—ICAPR 2001. Second International Conference. Proceedings; Rio de Janeiro, Brazil, Mar. 11-14, 2001 Lecture Notes in Computer Science, vol. 2, vol. 2013, Mar. 11, 2001 (Mar. 11, 2001), pp. 301-310.

Jianhui Chen, Peter Carr: "Mimicking Human Camera Operators", Published in: 2015 IEEE Winter Conference on Applications of Computer Vision, Waikoloa, HI, USA, Jan. 5-9, 2015.

\* cited by examiner

METHOD FOR CONTROLLING A ROBOTIC CAMERA AND CAMERA SYSTEM

FIELD

The present disclosure relates to a method for controlling a robotic camera and a camera system comprising a robotic camera.

BACKGROUND

In today's live broadcast production a plurality of staff is needed to operate the production equipment: camera men operate cameras including robotic cameras, a production director operates a video mixer, and another operator operates audio devices. Especially in sports events there are live slow-motion operators defining clips and replays. Often small broadcast companies cannot afford such a big staff and, therefore, have to restrain themselves to simple broadcast productions involving less broadcast production equipment which sometimes is difficult to reconcile with quality expectations from viewers.

Broadcast productions rely inevitably on camera images for sports productions. The cameras are operated by cameramen that either operate the camera independently based on their understanding of a scene, or because they receive instructions from a director. Lower-tier productions, e.g. lectures or amateur sports events, are extremely cost-sensitive. The operational cost of the cameramen is a significant portion of the total production cost. One possible approach to respond to the cost pressure is to utilize automatic broadcasting with robotic cameras that are operated automatically. In most cases the cameras are controlled by a simple object tracking paradigm such as "follow the ball" or "follow the lecturer". However, the result of this approach leaves room for improvement.

Today's state-of-the-art in camera automation includes techniques where a single camera covers a complete scene (e.g. a complete soccer field). Image processing techniques select a part out of this image view. In general, these technologies suffer from bad zooming capabilities because a single image sensor needs to cover a complete playing field. Even in case of a 4K camera, the equivalent of a regular HD image would still cover half of the playing field. As soon as one wants to zoom in on a smaller portion of the field, the resolution becomes problematic in the sense that image resolution does not meet the viewers' expectations any more. Alternative solutions include the use of multiple cameras, wherein their images are stitched together. This approach inevitably multiplies the costs by the number of cameras, and additionally requires a careful installation and calibration to avoid stitching artefacts and colour imbalances.

A second problem is the fact that in the commonly used approaches every camera is located at a fixed position, and hence the resulting view is always from that specific position, including the full perspective view. Recently efforts have been made to compensate for the perspective (e.g. disclosed in EP17153840.8). This latter approach reduces optical distortions, but the camera is still at a fixed position.

A third problem is that the techniques that are used to cut a smaller image out of a large field-covering image are generally technically acceptable, but do not meet the standards in professional broadcast.

In the paper "Mimicking human camera operators" published as https://www.disneyresearch.com/publication/mimicking-human-camera-operators/ a different approach is proposed that includes tracking exemplary camera work by a human expert to predict an appropriate camera configuration for a new situation in terms of P/T/Z (Pan/Tilt/Zoom) data for a robotic camera.

There remains a desire for an automated camera system that does neither suffer from the limitations with regard to limited resolution when the camera zooms into a specific scene nor from the fact that the camera has a fixed position.

SUMMARY

According to a first aspect the present disclosure suggests a method for controlling a robotic camera capturing a portion of a playing field. The method comprises
  automatically determining an image region of interest in a reference image of the playing field;
  associating the image region of interest with a physical region of interest on the playing field;
  deducting from the physical region of interest control parameters for the robotic camera such that the robotic camera captures the physical region of interest on the playing field.

Based on the deducted control parameters the method according to the present disclosure achieves that the portion of the playing field captured by the robotic camera corresponds to the physical region of interest corresponding to the image region of interest. In other words, the robotic camera captures the portion of the playing field a spectator in the stadium would probably watch. As a result the viewer in front of the TV screen sees the same scene that he would watch when he would be in the stadium. The method is applicable to soccer, basketball, football and other field games but it is not limited to a specific game as long as the artificial intelligence is trained for the specific game it is applied to.

According to an embodiment the method comprises capturing the reference image of the playing field such that the reference image shows the whole playing field or a portion of the playing field. Advantageously, the reference image covering the entire playing field inherently always contains the most interesting scene. Consequently, the image region of interest can reliably be identified in the reference image.

In a further development the method comprises
  receiving a user input for controlling the robotic camera and
  in response to the user input, generating control parameters for the robotic camera which override the deducted control parameters for the robotic camera. This feature is particularly advantageous if something exceptional happens on the playing field such that the automatic determination of the image region of interest needs correction by human intervention.

In that case a useful development of the method comprises associating the control parameters generated in response to the user input with a currently captured reference image of the playing field. In this way it is possible to improve the automatic determination of the image region of interest. This is pertinent in particular if the automatic determination of the image region of interest is determined by means of a neural network, a Bayesian network, a support vector machine, heuristic rules or a program library.

In one embodiment the method comprises capturing the reference image of the whole playing field by a static camera. Using a static camera is a comparatively simple and reliable approach for generating reference images.

According to an alternative embodiment the method comprises capturing the reference image of the portion of the playing field by the robotic camera. That means that the image of the playing field currently captured by the robotic camera represents the reference image.

As an improvement to the alternative embodiment the method further comprises driving the robotic camera into a default position if no deducted control parameters for the robotic camera are available. In this way it is assured that the robotic camera still produces the meaningful video stream, e.g. by zooming out and directing the focus on the center of the playing field. For instance, the robotic camera could zoom out to an extent that it captures the entire playing field which increases the chances to find an image region of interest again.

According to a variant of the method in accordance with to the present disclosure the robotic camera receives a user input causing the robotic camera to move into a selected one of one or more default positions. For instance, the robotic camera could be directed to one of the 16m rooms or to the center circle on a soccer field in response to a user input. This is another possible way for human intervention if for example the program director feels the need to focus on another image region of interest than the one that has been determined automatically.

In most cases it has been found useful when the method includes initially driving the robotic camera into a start position. The predefined start position may provide advantages for the automatic determination of an image region of interest.

In an improved embodiment the method claims further comprises taking into account rules of the game being played on the playing field when determining the image region of interest. The rules may help determining the region of interest because the players will act in compliance with the rules. To this end the artificial intelligence needs to be trained with the applicable rules of the game.

In yet another embodiment the method further comprises taking into account acoustic signals when determining the image region of interest. Such acoustic signals could be the reactions of the spectators in the stadium. Referee whistle blows are of particular interest because the players will react in a certain way in response to the whistle blows. Again, the artificial intelligence needs corresponding training to be able to take the additional information into account.

In a further embodiment the method further comprises controlling multiple robotic cameras that generate different camera views. Advantageously, this embodiment automatically creates different camera views which are made available for a production director who can select one of the camera views. The method enables an automatic broadcast production of an event with a certain flexibility for the production director who can choose among several different camera views.

According to a second aspect the present disclosure suggests a camera system comprising a robotic camera and a data processing apparatus connected with the robotic camera. The data processing apparatus receives image data representing reference images of a playing field and is configured to automatically determine in each received reference image an image region of interest. The data processing apparatus is further configured to associate the image region of interest with a physical region of interest on the playing field. The physical region of interest serves as input data for calculating control parameters for the robotic camera such that the robotic camera captures the physical region of interest. The camera system according to the present disclosure enables automatic coverage of an event e.g. a soccer game. The camera system aims at capturing those scenes on the playing field that the spectator in a stadium would watch. According to an embodiment of the camera system it comprises a static camera capturing reference images providing reference image data for the data processing apparatus.

In a practical implementation the data processing apparatus can execute software implementing a neural network, a Bayesian network, a support vector machine, heuristic rules or a program library. Advantageously the neural network and its alternatives work in real-time and effectuate artificial intelligence.

BRIEF DESCRIPTION OF DRAWINGS

Exemplary embodiments of the present disclosure are illustrated in the drawings and are explained in more detail in the following description. In the figures the same or similar elements are referenced with the same or similar reference signs. It shows.

DESCRIPTION OF EMBODIMENTS

Figure 1:
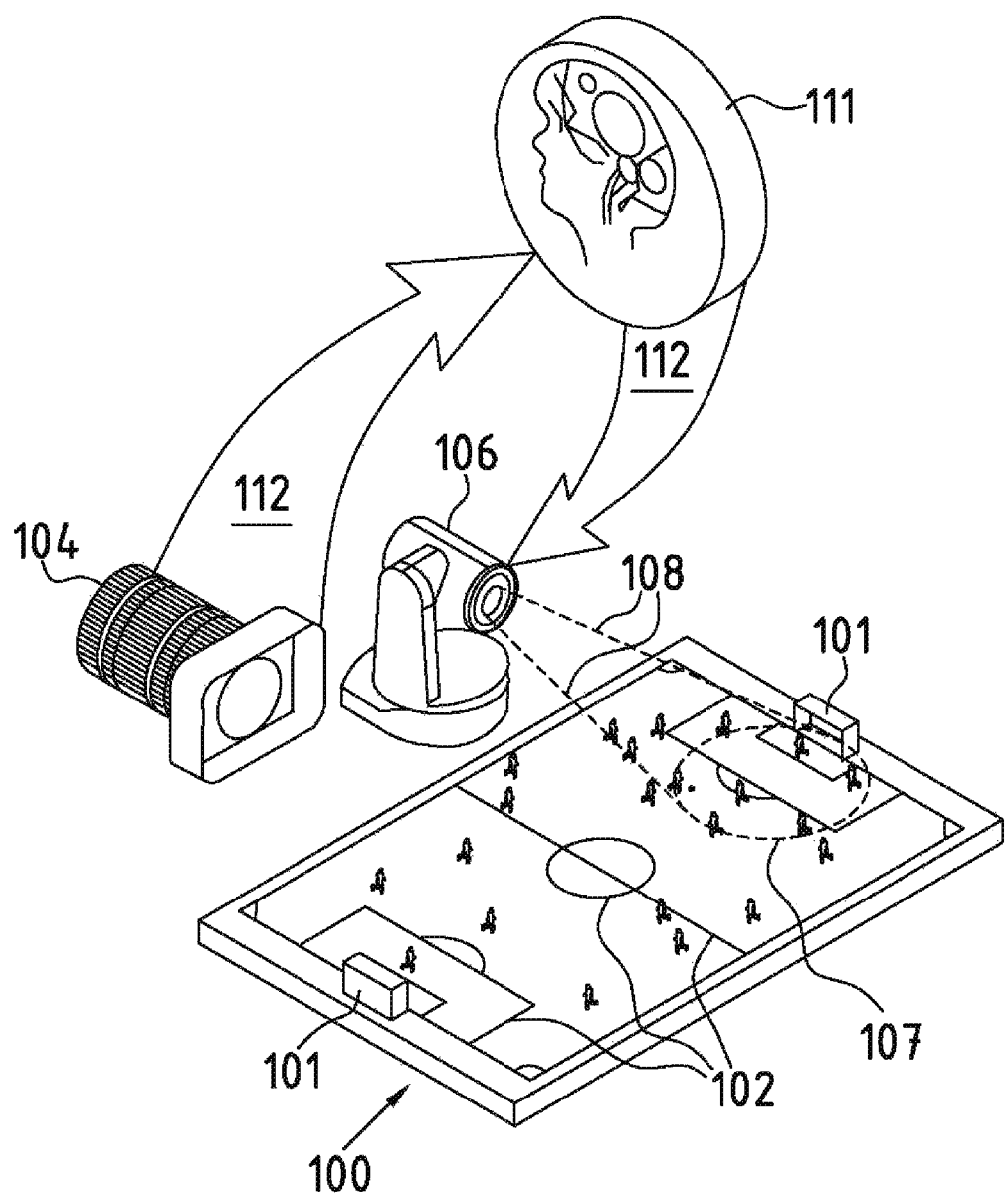
FIG. 1 a soccer game playing field in perspective view with cameras directed to the playing field.

Reference herein to "one embodiment" or "an embodiment" means that a particular feature, structure, or characteristic described in connection with the embodiment can be included in at least one implementation of the disclosure. The appearances of the phrase "in one embodiment" in various places in the specification are not necessarily all referring to the same embodiment, nor are separate or alternative embodiments necessarily mutually exclusive of other embodiments.

While the disclosure may be susceptible to various modifications and alternative forms, specific embodiments have been shown by way of example in the drawings and will be described in detail herein. However, it should be understood that the disclosure is not intended to be limited to the particular forms disclosed.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The embodiments described below comprise separate devices to facilitate the understanding of different functional group of the present disclosure. However, it is to be understood that some devices may very well integrated in a single device.

First Embodiment

FIG. 1 displays a perspective view on a soccer game playing field 100. Goals 101 are located at the respective ends of the playing field 100. Field lines 102 and players 103 are visible on the playing field 100. From a point outside of the playing field 100 a static wide angle camera 104 covers the entire playing field, i.e. the wide angle camera 104 captures an image that contains all players 103 on the playing field with field lines and the goals 101. Furthermore, there is a robotic camera 106 which is movable on tracks (not shown) to change its position and can be operated to take different viewpoints as well as different P/T/Z (Pan/Tilt/Zoom) settings. The robotic camera 106 is equipped with an optical zoom. Therefore, the robotic camera 106 can zoom into a scene without losing resolution of the video image. In FIG. 1 a scene on which the robotic camera has zoomed in is indicated by a dashed circle 107. The scene in the circle 107 represents only a partial view of the playing field. Lines 108 indicate the viewing angle of the robotic camera 106.

The cameras 104 and 106 are communicatively connected with a data processing apparatus 111. The data processing apparatus 111 is for instance implemented as software running on a server executing a neural network in real time. The neural network effectuates artificial intelligence. In the following the data processing apparatus will, therefore, be referred to briefly as "artificial intelligence 111". The artificial intelligence 111 can include several neural networks trained for different purposes and executed in parallel. Data connections enabling data communication between the cameras 104, 106 and the artificial intelligence 111 are symbolized by arrows 112 in FIG. 1. The static camera 104, the robotic camera 106 and the artificial intelligence 111 form a camera system.

The artificial intelligence 111 has been trained with a large number of images or single frames showing very many situations in a soccer game with the additional information at what region spectators look in this particular situation of the game. This region is called in the following "region of interest" which is two-fold: The region of interest corresponds to a physical region on the playing field and a region of interest in an image captured by a camera. To distinguish the two we will refer to the former one as "physical region of interest" and to the latter one as "image region of interest".

Soccer is only chosen as an example for many different kinds of games including football and basketball. The present disclosure is not limited to a particular kind of game performed on a playing field. The only requirement is that the artificial intelligence 111 for the specific game it is applied to.

In a high-quality broadcast coverage of a sports event an image captured by a camera covering the event corresponds to the image region of interest. The result is that a viewer in front of a TV sees essentially the same as what he would watch if he was watching the live event in the stadium.

According to the present disclosure training enables the artificial intelligence 111 to determine the image region of interest in every image captured by a camera and to control a robotic camera to follow the image region of interest which dynamically evolves during a game. As a result, the robotic camera automatically outputs a video stream with a quality comparable to a video stream produced by a human cameraman.

In the following it will be explained how this aim is achieved technically beginning with an explanation how the system is calibrated.

Calibration Process for Cameras

Camera calibration is the process of determining the geometrical transformation that the camera applies to the real world by projecting it on an image plane. The calibration takes into account the physical parameters of the camera. These parameters include the position of the camera in 3-dimensional space that can be expressed in a suitable coordinate system, e.g. Cartesian coordinates (x,y,z), from any given reference point; the position can be expressed as a distance from the reference point for each coordinate in meters or any other suitable measure;

the focal length of the objective in meters or any other suitable measure or the zoom factor of the objective, and pan, tilt, and roll angles of the camera in degrees.

Figure 2A:
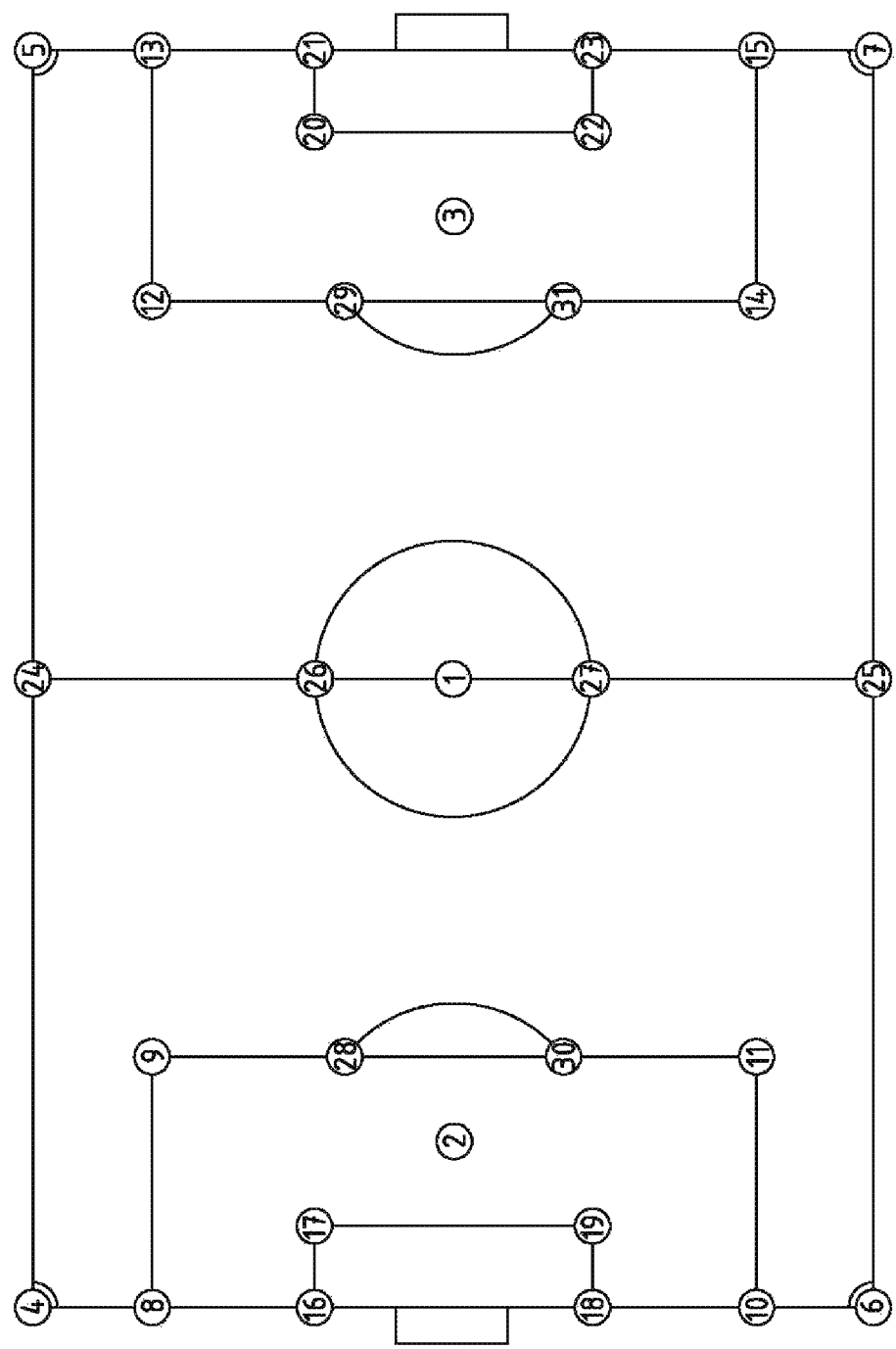
FIG. 2A a soccer game playing field in a top view with predefined positions.

At first the calibration of the static camera 104 is explained. Camera 104 feeds image data to the artificial intelligence 111. The artificial intelligence 111 automatically classifies each pixel of the camera image into a plurality of classes, wherein the classes correspond to predefined locations on the playing field. In one embodiment of the present disclosure the predefined locations are intersections of field lines on the playing field. FIG. 2A shows intersections of field lines on a soccer field. Each intersection is marked with a circle having an index number 1 to 31 in the circle. Of course, the present disclosure is not limited to intersections of field lines. Any easily identifiable location can be used equally well.

Figure 2B:
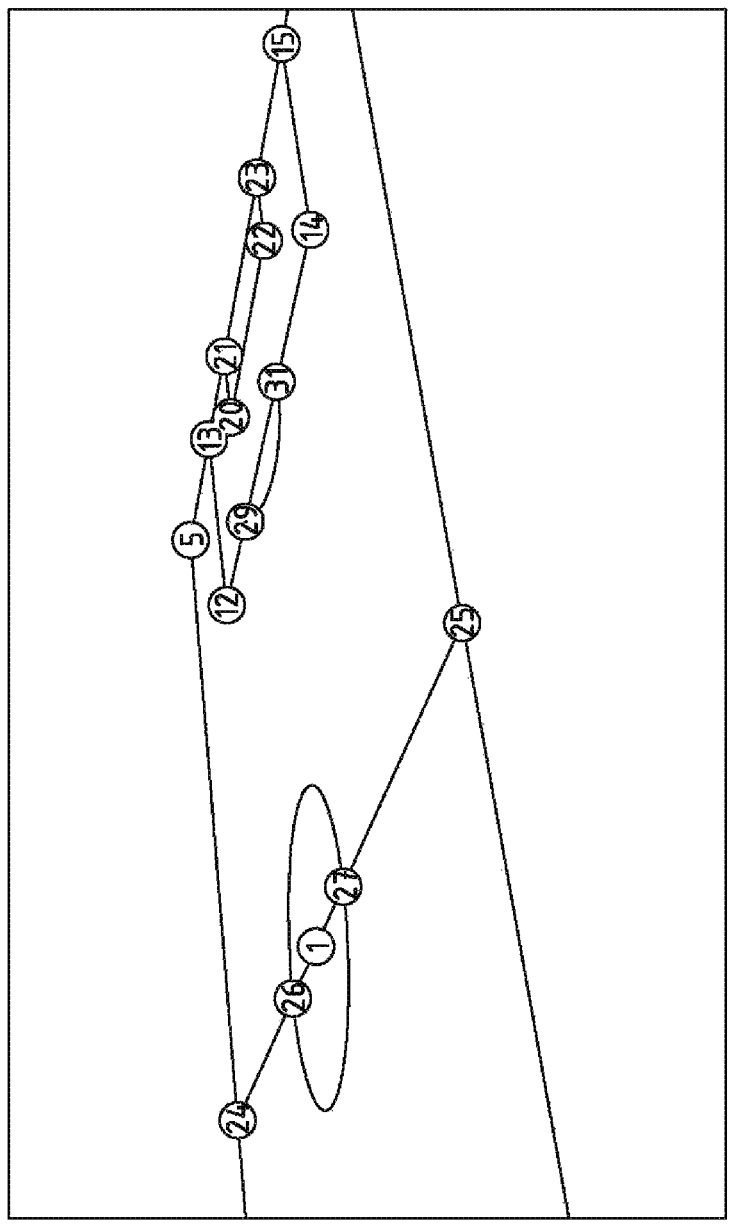
FIG. 2B the soccer game playing field of FIG. 2A in a perspective view.
Figure 3:
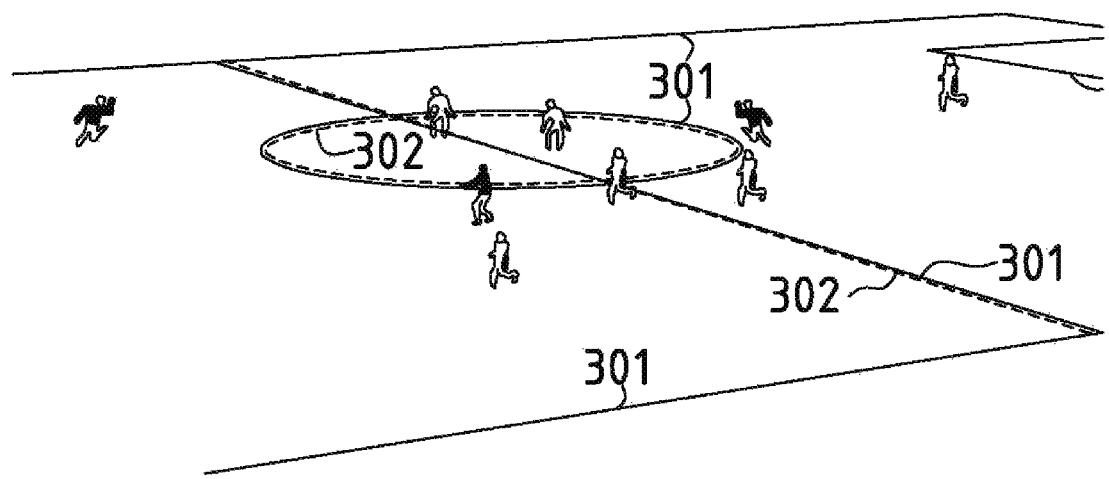
FIG. 3 a soccer game playing field with detected field lines and calculated field lines.

The artificial intelligence 111 has been trained to detect corresponding locations in the camera image as it is shown in FIG. 2B. The artificial intelligence 111 generates for each pixel in the camera image a triplet composed of the geometric position of the pixel in the image and a class identifying whether the pixel corresponds to one of the predefined locations: (x,y,class). Based on these triplets the artificial intelligence 111 calculates a first estimate of a geometric transformation that transforms the top view of the playing field into the playing field captured by the camera 104. The known geometric transformation enables the artificial intelligence 111 to calculate field lines in the camera image and to compare the calculated field lines with the field lines captured in the image. The comparison is illustrated in FIG. 3 as a composite image where field lines captured by the camera 104 are shown as solid lines 301 and the field lines calculated according to the first estimate of the geometric transition are shown as dashed lines 302. As it can be seen from FIG. 3 there are deviations between the field lines 301 and 302. For better illustration the deviations are exaggerated, i.e. in reality the deviations are smaller.

The artificial intelligence 111 compares the positions of the detected field lines 301 in the camera image with the calculated field lines 302 and refines the geometric transformation to minimize the differences and/or deviations between the two sets of field lines.

The geometric transformation has eight degrees of freedom (parameters) corresponding to the eight degrees of freedom of a homography. Background information about homography can be found in a tutorial published in the Internet at the link https://docs.opencv.org/3.4.1/d9/dab/tutorial_homography.html Finding a refined geometric transformation consists in finding the set of parameter values that causes the calculated lines 302 in the composite image to overlap as good as possible the field lines 301 detected by the artificial intelligence 111. According to the approach of the present disclosure the first estimate mentioned above is used as a starting point. Subsequently, the 8-dimensional parameter space is explored. This exploration is conducted in an iterative fashion. At each iteration one parameter in the parameter space is incremented. At each iteration, a step of fixed (given) extent in the 8-dimensional parameter space is made. The orientation chosen for this step is the one that increases the most the overlap between the calculated field lines 402 and the detected field lines 401. This process stops when it is no longer possible to make a step that increases the overlap. Such procedure is known in the literature as "iterative gradient descent".

It is also noted that the artificial intelligence 111 does not create an image as shown in FIG. 3. FIG. 3 only serves to illustrate the mathematical process.

Figure 4A:
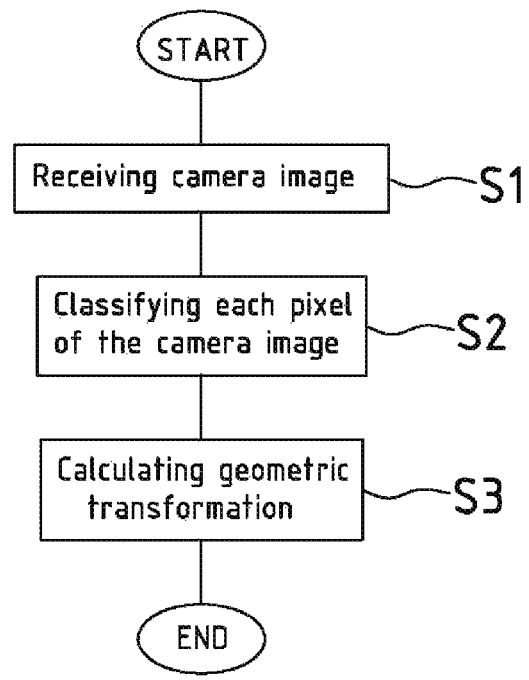
FIG. 4A a flow diagram of a calibration process for a static camera.

FIG. 4A exhibits a flow diagram of the calibration process of the static camera 104. In step S1 images are received and transmitted to the artificial intelligence 111. In step S2 the artificial intelligence 111 classifies each pixel of each camera image to determine whether the pixel belongs to a predefined position such as an intersection of field lines on a playing field. The result of processing step S2 is a data triplet containing the geometric position of the pixel in the camera image and the corresponding class information. The data triplet is used in step S3 to calculate the geometric transformation which is associated with the camera perspective capturing the playing field.

Since the camera parameters of the static camera 104 are fixed the calibration needs to be performed only once.

A similar calibration process is performed for the robotic camera 106. The calibration of the robotic camera and the determination of its camera parameters, namely the position in 3-dimensional space, pan, tilt, and roll angles, zoom factor is the same as that of the static camera, except that it has to be repeated for each new frame since the robotic camera 106 may be moving at any time.

It is noted that depending on the particular model of the robotic camera, it may be considered that the camera parameters (pan/tilt/zoom) returned by the programming interface (API) used to drive the camera are correct, I.e. reflect the real physical setting of the camera. If the camera parameters returned from the programming interface cannot be considered to reflect the real setting of the robotic camera the automatic calibration process based on the artificial intelligence 111 is applied on each frame captured by the robotic camera 106. Once the geometric transformation or homography is determined the corresponding correct camera parameters of the robotic camera are calculated.

Figure 4B:
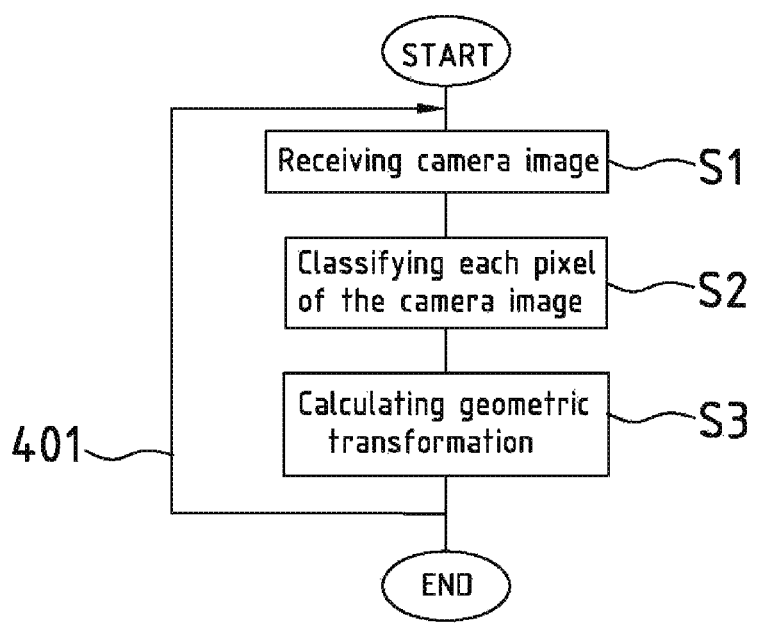
FIG. 4B a flow diagram of a calibration process for a robotic camera.

FIG. 4B shows the flow diagram of the calibration process for the robotic camera which is similar to the flow diagram shown in FIG. 4A except for a feedback loop 401 because the calibration for the robotic camera has to be repeated for each frame.

Figures 5A, 5B:
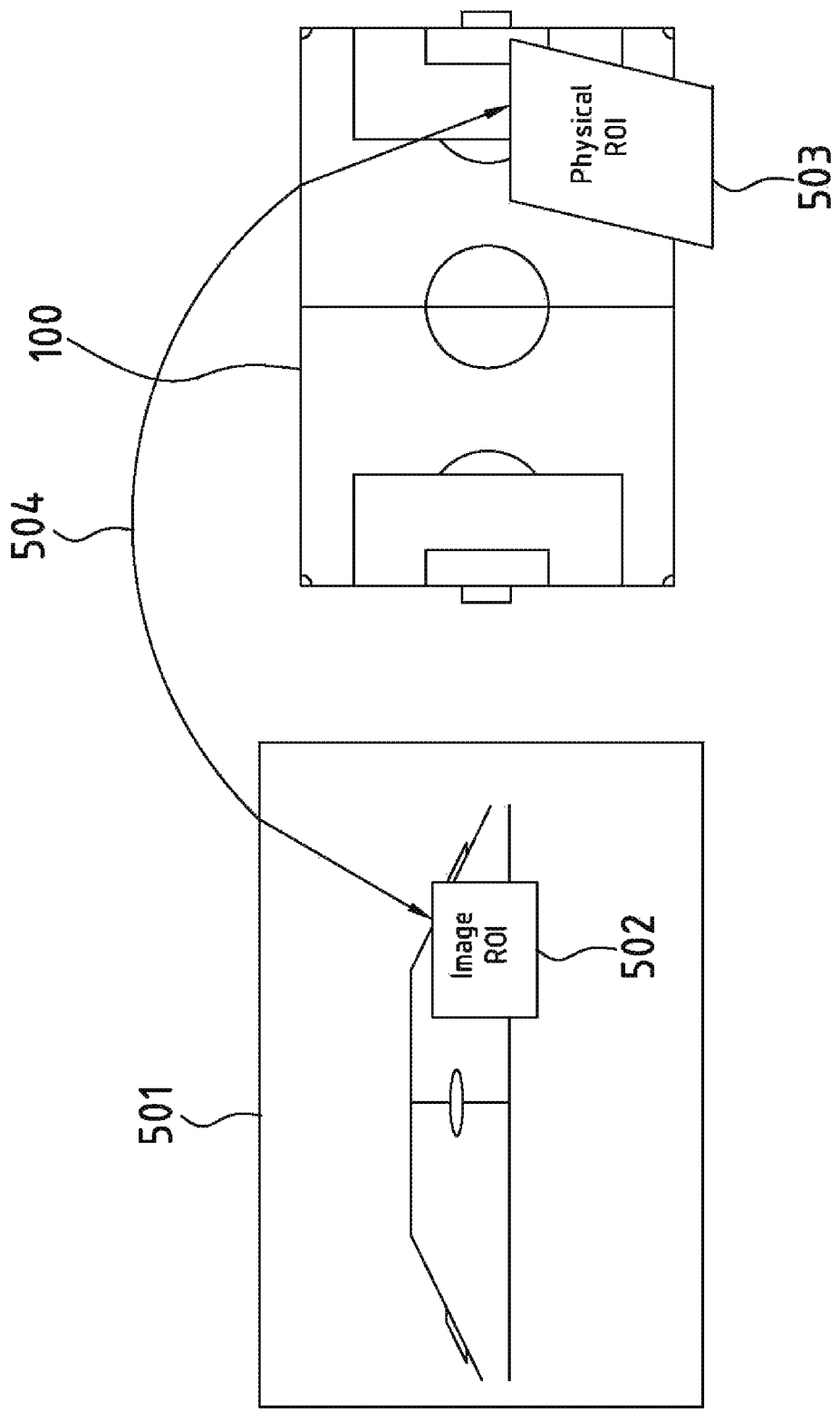
FIG. 5A a static camera image in which an image region of interest is determined.
FIG. 5B an illustration of the transformation of an image region of interest shown in FIG. 5A into a physical region of interest.

FIG. 5A schematically shows an image 501 taken by the static camera 104. In the image 501 an image region of interest (ROI) 501 is determined and indicated as a square. The determined image region of interest 502 is transformed into a physical region of interest 503 that is shown in FIG. 5B in a top view on the playing field 100. The transformation is symbolized by an arrow 504. Since the physical region of interest 503 is linked with camera parameters of the robotic camera 106, as it has been explained above, it is possible to control the robotic camera in coherence with the image region of interest provided the image region of interest is known. That means it is possible to automatically control the robotic camera such that it actually captures the image region of interest 502 determined by the artificial intelligence 111. How the determination of image region of interest 502 is executed will be described in the next section.

Determining the Image Region of Interest

In the first embodiment the artificial intelligence 111 is trained with static images or frames of play situations on the playing field. Each image shows the whole playing field. For each image an image region of interest is identified and associated with the image by human intervention. The image region of interest is stored as metadata together with the image data. In different words the training set for the artificial intelligence 111 consist of human annotated footage where a human has highlighted the most interesting region in each frame. In a specific implementation the human has highlighted the most interesting square region of a given size on each frame. In other variants the highlighted region may have a different shape, e.g. a circular shape.

Figure 6B:
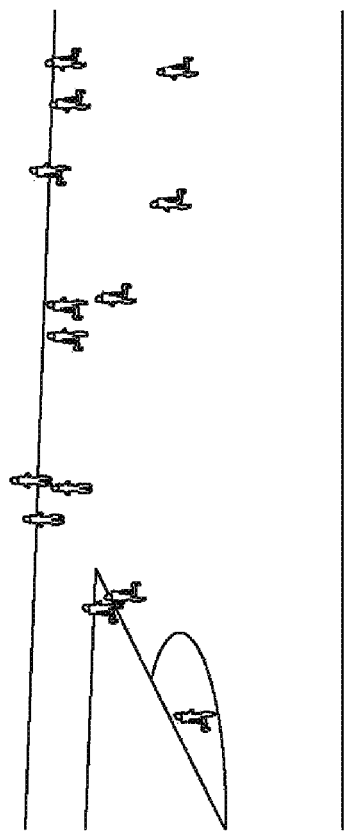
FIG. 6B an image region of interest determined from the first situation shown in FIG. 2A.
Figure 6A:
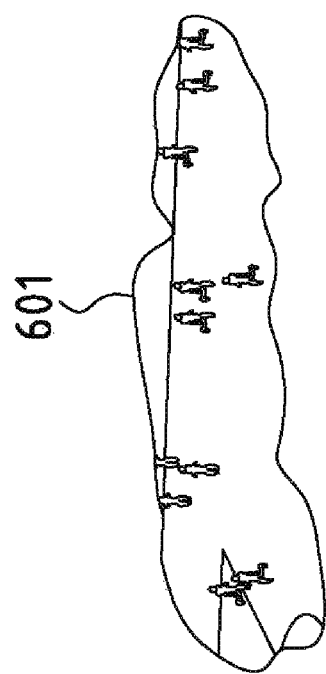
FIG. 6A a first situation in a soccer game.

After the training the artificial intelligence 111 is enabled to determine an image region of interest in each frame captured by the static wide-angle camera as it is shown exemplarily in FIGS. 6A and 6B. FIG. 6A illustrates a first situation in a game and FIG. 6B the output of the artificial intelligence 111, i.e. an image region of interest 601. The artificial intelligence 111 not only determines the location of the image region of interest 601 on the playing field but also the size of it.

Figure 7B:
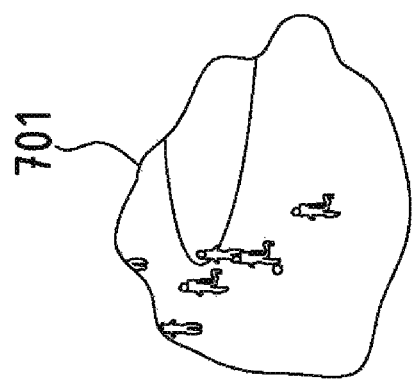
FIG. 7B an image region of interest determined from the second situation shown in FIG. 7A.
Figure 7A:
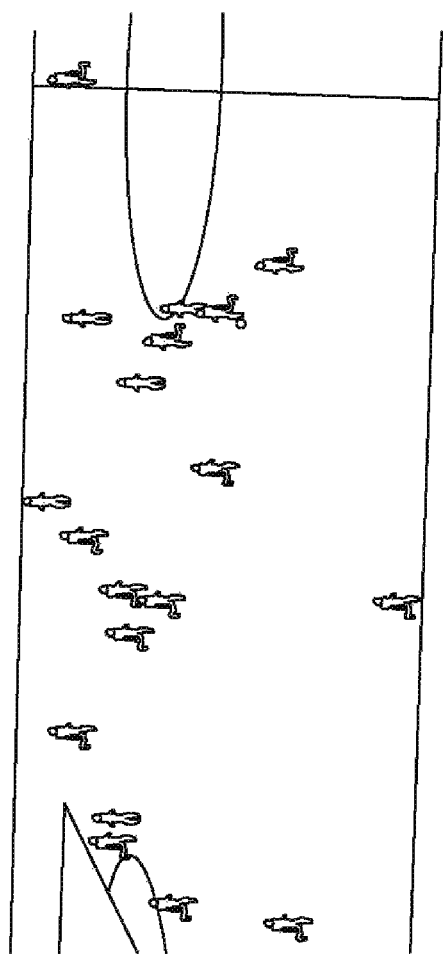
FIG. 7A a second situation in a soccer game.

The resulting output of the artificial intelligence 111 changes dynamically as the playing situation evolves on the playing field 100. FIG. 7A shows another exemplary game situation and FIG. 7B the output of the artificial intelligence 111, namely another image region of interest 701 that differs in size, shape and location from the image region of interest displayed in FIG. 6B.

After the calibration of the static camera 104 the geometrical transformation is known that transforms any image region of interest in a corresponding physical region of interest on the playing field 100.

Figure 8:
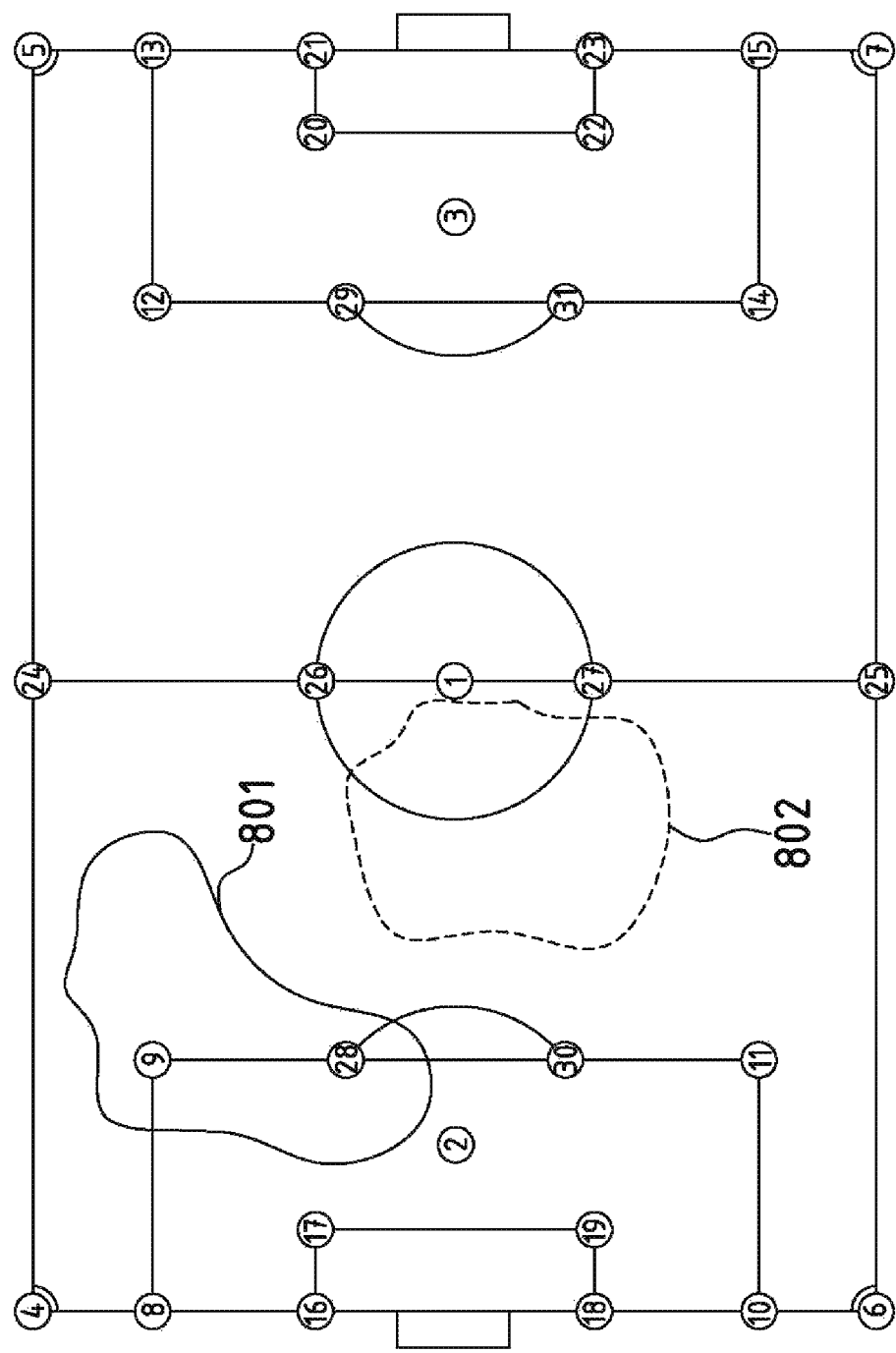
FIG. 8 a soccer game playing field as a top view indicating the area of interest of FIGS. 6B and 7B.

FIG. 8 shows the result of the associated transformations of the image regions of interest 601 and 701, respectively, into corresponding physical regions of interest 801 and 802, respectively.

Figure 9:
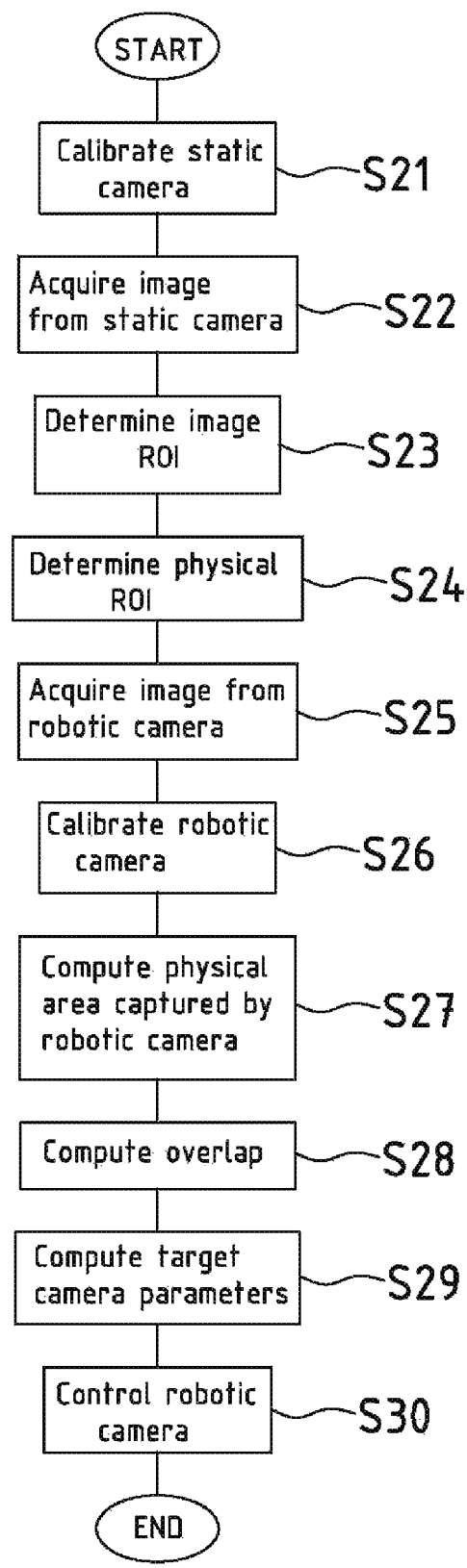
FIG. 9 a flow diagram illustrating a first method for controlling a robotic camera.

FIG. 9 summarizes the method for controlling the robotic camera in a flow diagram In a first step S21 the camera parameters of the static camera 104 are determined and calibrated. Step S21 has to be performed only once since the setting of the static camera 104 is not changed during the broadcast production. In step S22 an image of the static camera 104 is acquired. In step S23 the image region of interest is determined in the image acquired by the static camera 104. In step S24 a physical region of interest is determined that corresponds to the previously determined image region of interest. Then an image of the robotic camera is acquired in step S25 and in step S26 the current camera parameters of the robotic camera 106 are calibrated and determined for each frame captured by the robotic camera 106.

In step S27 the physical area 1005 (FIG. 10B) captured by the robotic camera 106 is computed. The physical area 1005 is similar to the trapezoid shown in FIG. 10B. In step S28 and overlap between the physical region of interest 801, 802 and physical area 1005 seen by the robotic camera is computed. In step S29 a set of target camera parameters for the robotic camera are computed that maximize the overlap between the physical region of interest 801, 802 and the physical area 1005 seen by the robotic camera 106. Finally, in step S30 steering commands for the robotic camera 106 are computed such that the setting of the robotic camera 106 stays as close as possible to the set of camera parameters determined in step S29. In an embodiment this is achieved by sending the target camera parameters and the current camera parameters as input to a PID controller (not shown) that issues control commands to the robotic camera 10 According to an alternative embodiment the PID-controller can be replaced by a device executing reinforcement learning.

Second Embodiment

According to a second embodiment the method fully relies on the camera images obtained from the robotic camera 106, i.e. no static camera 104 is involved any more. Hence, the second embodiment is entirely based on the images or frames captured by the robotic camera. Consequently, the artificial intelligence 111 in the second embodiment determines the image region of interest not from a complete wide angle view of the static camera 104 but from a partial current view of the robotic camera 106. Similar to the first embodiment the image region of interest is then transferred to a physical region of interest.

Figure 10B:
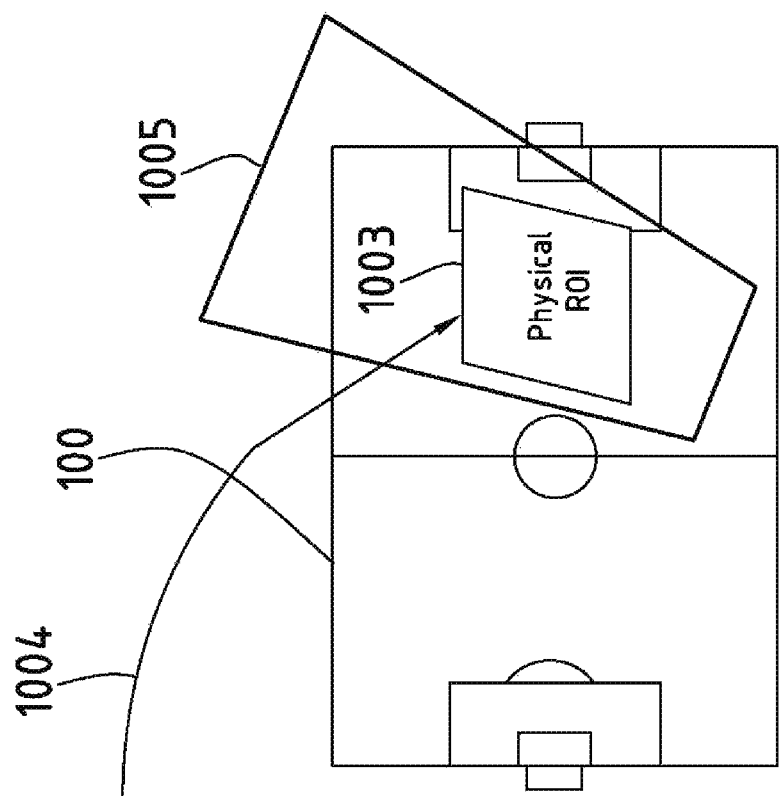
FIG. 10B an illustration of the transformation of an image region of interest shown in FIG. 10A into a physical region of interest.
Figure 10A:
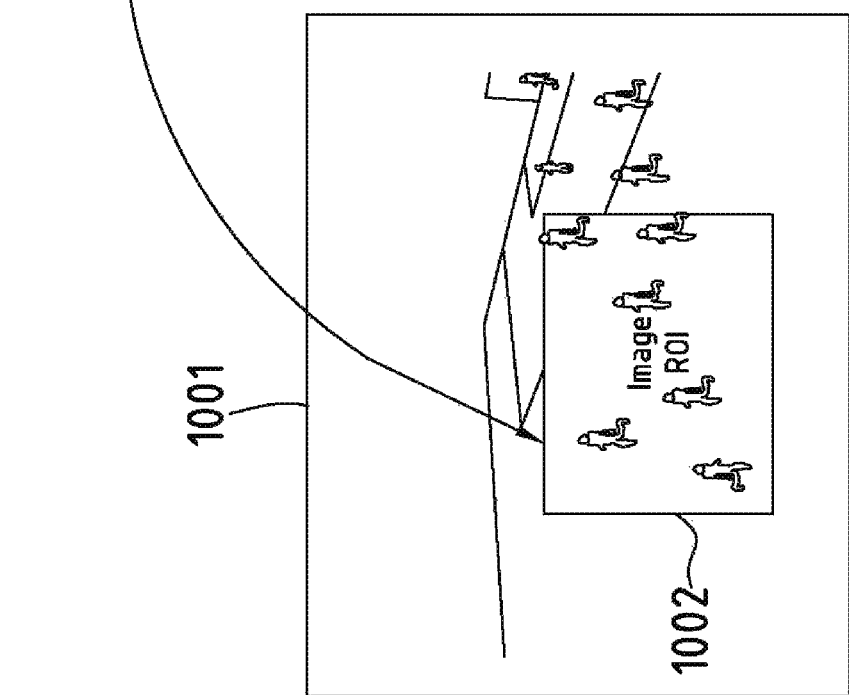
FIG. 10A a robotic camera image in which an image region of interest is determined.

FIG. 10A illustrates a current robotic camera view 1001. Within this camera view or image the artificial intelligence 111 determines the image region of interest indicated by a square 1002. The calibration of the robotic camera 106 is the same as in the first embodiment. The determined image region of interest 1002 is transformed into physical region of interest 1003 that is shown in FIG. 10B in a top view on the playing field 100. The transformation is symbolized by an arrow 1004. FIG. 10B also shows as a trapezoid 1005 the area on the playing field 100 corresponding to the camera view of the robotic camera 106 shown in FIG. 10A. Since the robotic camera 106 tends to follow the region of interest, the image region of interest is located essentially in the centre of the camera view or image 1001.

In accordance with the second embodiment the artificial intelligence 111 determines the most likely next image region of interest based on the current camera view. In different words one could say the artificial intelligence 111 extrapolates an upcoming next image region of interest form a current image region of interest captured by the robotic camera 106. Obviously the artificial intelligence 111 needs to be trained with dedicated data for this purpose. The training data for the second embodiment are different than the training data for the first embodiment. But like in the first embodiment the artificial intelligence 111 is trained with images or frames of playing situations that are annotated by a human identifying the next image region of interest.

Figure 11:
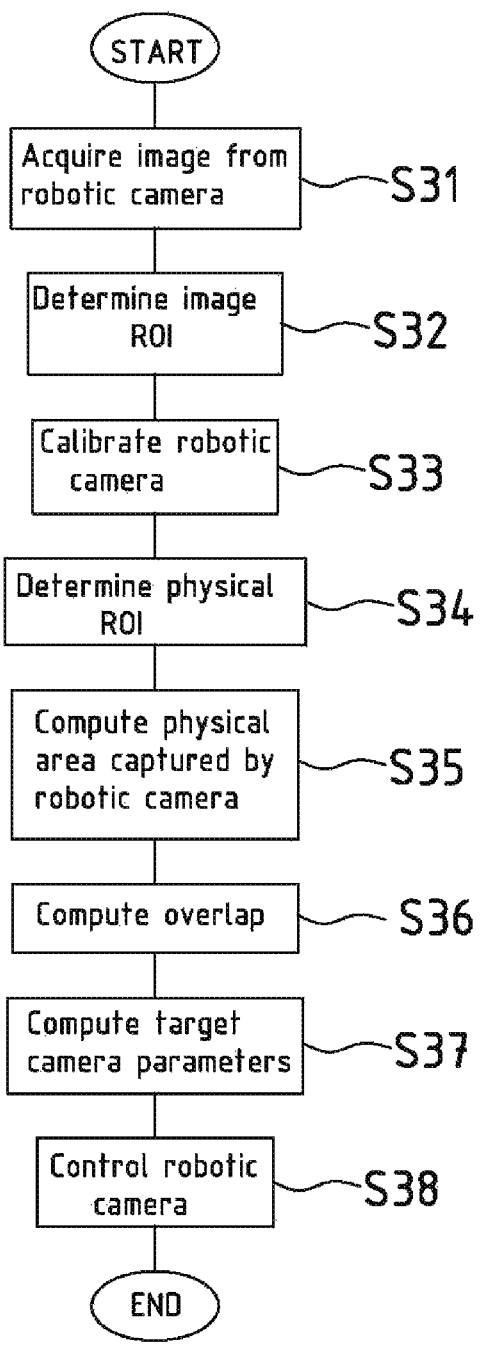
FIG. 11 a flow diagram illustrating a second method for controlling a robotic camera.

FIG. 11 illustrates the control process for the robotic camera according to the second embodiment. In a first step S31 an image of the robotic camera is acquired. In step S32 an image region of interest in the image captured by the robotic camera is determined. In step S33 the current camera parameters of the robotic camera 106 are calibrated and determined as it has been described above. In step S34 and the corresponding physical region of interest is determined. Then in step S35 the physical area 1005 (FIG. 10B) seen by the robotic camera 106 is determined. In step S36 an overlap between the physical region of interest 801, 802 and the physical area 1005 seen by the robotic camera 106 is computed. In step S37 a set of target camera parameters for the robotic camera are computed that maximize the overlap between the physical region of interest 801, 802 and the physical area 1005 seen by the robotic camera 106. Finally, in step S38 steering commands for the robotic camera 106 are computed such that the setting of the robotic camera 106 stays as close as possible to the set of camera parameters determined in step S37. In an embodiment this is achieved by sending the target camera parameters and the current camera parameters as input to a PID controller (not shown) that issues control commands to the robotic camera 10 According to an alternative embodiment the PID-controller can be replaced by a device executing reinforcement learning.

In case the artificial intelligence 111 cannot find with a sufficiently high degree of confidence a good position for the next frame, the robotic camera 106 is controlled to move to a fall-back or default position which is based on zooming out the image. For instance, the robotic camera could zoom out to an extent that it captures the whole playing field. Alternatively, the director can decide to bring the camera to a start position.

According to a variant applicable to both the first and second embodiment, the method and the camera system of the present disclosure allow human intervention. Specifically, an operator or director can override the robotic camera control with manual inputs. The resulting camera setting can be back translated into a correction of the image region of interest. The correction also serves to augment the training data for the artificial intelligence 111.

According to another variant the method further comprises controlling multiple robotic cameras that generate different camera views. For instance, on one robotic camera could be placed on each side of the playing field shown in FIG. 1. The four robotic cameras 106 (only one is shown in FIG. 1) generate different camera views. Hence, this embodiment automatically creates different camera views which are made available for a production director who can select one of the camera views. The method enables an automatic broadcast production of an event with certain flexibility for the production director who can choose among several different camera views.

REFERENCE SIGNS LIST

100 Playing field
101 goal
102 Lines
103 Players 104 wide angle static camera
106 robotic camera
107 circle
108 viewing angle
111 artificial intelligence
112 arrows
301 captured field lines
302 estimated field lines
401 Feedback loop
501 camera image
502 image region of interest
503 physical region of interest
504 arrow
601 image region of interest
701 image region of interest
801 physical region of interest
802 physical region of interest
1001 camera view
1002 image region of interest
1003 physical region of interest
1004 camera view
1005 arrow

The invention claimed is:

1. Method for controlling a robotic camera capturing a portion of a playing field, wherein the method comprises capturing a reference image of the whole playing field by a static camera;
automatically determining an image region of interest in a reference image of the playing field;
transforming the determined image region of interest into a physical region of interest on the playing field;
computing an overlap between the physical region of interest on the playing field and a physical area captured by a camera view of the robotic camera;
calculating a set of target camera parameters for the robotic camera to maximize the overlap between the physical region of interest and the physical area captured by the camera view of the robotic camera; and
computing steering commands for the robotic camera to control the camera view of the robotic camera such that setting of the robotic camera corresponds to the set of target camera parameters, which maximize the overlap between the physical region of interest and the physical area captured by the camera view of the robotic camera.

2. Method according to claim 1, further comprising capturing the reference image of the playing field such that the reference image shows the whole playing field or a portion of the playing field.

3. Method according to claim 2, further comprising receiving a user input for controlling the robotic camera and
generating in response to the user input control parameters for the robotic camera which override the calculated set of target camera parameters for the robotic camera.

4. Method according to claim 3, further comprising associating the control parameters generated in response to the user input with a currently captured reference image of the playing field.

5. Method according to claim 1, further comprising receiving a user input for controlling the robotic camera and
generating in response to the user input control parameters for the robotic camera which override the calculated set of target camera parameters for the robotic camera.

6. Method according to claim 5, further comprising associating pan/tilt/zoom parameters of the control parameters generated in response to the user input with a currently captured reference image of the playing field.

7. Method according to claim 1 further comprising driving the robotic camera into a default position if no target camera parameters for the robotic camera are available.

8. Method according to claim 1 further comprising receiving a user input causing the robotic camera to drive into a default position.

9. Method according to claim 1 further comprising initially driving the robotic camera into a start position.

10. Method according to claim 1 further comprising taking into account rules of a game being played on the playing field when determining the image region of interest.

11. Method according to claim 1 further comprising taking into account acoustic signals when determining the image region of interest.

12. Method according to claim 1 further comprising controlling multiple robotic cameras that generate different robotic camera views.

13. Camera system comprising a robotic camera, a static camera, and a data processing apparatus connected with the robotic camera and the static camera, wherein the data processing apparatus receives image data from the static camera, wherein the image data represent reference images of a playing field, wherein the data processing apparatus is configured to automatically determine in each received reference image an image region of interest; the data processing apparatus is further configured to transform the determined image region of interest into a physical region of interest on the playing field and to compute an overlap between the physical region of interest on the playing field and a physical area captured by a camera view of the robotic camera, wherein the physical region of interest serves as input data for calculating a set of target camera parameters for the robotic camera that maximize the overlap between the physical region of interest and the physical area captured by the camera view of the robotic camera; wherein the data processing apparatus is configured to compute steering commands for the robotic camera such that setting of the robotic camera corresponds to the set of target camera parameters, which maximize the overlap between the physical region of interest and the physical area captured by the camera view of the robotic camera.

14. Cameras system according to claim 13, wherein the data processing apparatus executes software implementing a neural network, a Bayesian network, a support vector machine, heuristic rules or a program library containing programs for automatically determining the image region of interest.

* * * * *